US011965423B1

(12) United States Patent
Frederick et al.

(10) Patent No.: US 11,965,423 B1
(45) Date of Patent: Apr. 23, 2024

(54) SYSTEM AND PROCESS FOR RESTARTING A TURBOMACHINE

(71) Applicant: General Electric Company, Schenectady, NY (US)

(72) Inventors: Garth Curtis Frederick, Greer, SC (US); Brett Darrick Klingler, Piedmont, SC (US); Kenneth Damon Black, Travelers Rest, SC (US); Radu Ioan Danescu, Greer, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 18/196,011

(22) Filed: May 11, 2023

(51) Int. Cl.
*F01D 19/02* (2006.01)

(52) U.S. Cl.
CPC .......... *F01D 19/02* (2013.01); *F05D 2260/85* (2013.01)

(58) Field of Classification Search
CPC ............. F05D 2260/85; F05D 2260/94; F05D 2260/941; F01D 21/00; F01D 19/02
See application file for complete search history.

(56) References Cited

U.S. PATENT DOCUMENTS

| | | | | | |
|---|---|---|---|---|---|
| 3,898,439 | A * | 8/1975 | Reed | F02C 9/26 | 708/1 |
| 3,911,285 | A * | 10/1975 | Yannone | F02C 9/32 | 322/14 |
| 4,308,463 | A * | 12/1981 | Giras | H02J 3/42 | 290/40 R |
| 4,380,146 | A * | 4/1983 | Yannone | F02C 9/00 | 60/790 |
| 4,854,120 | A * | 8/1989 | Nelson | F01D 21/06 | 60/39.091 |
| 8,918,264 | B2 * | 12/2014 | Jegu | F02C 7/262 | 701/100 |
| 9,404,426 | B2 * | 8/2016 | Wichmann | F01D 21/003 | |
| 9,988,928 | B2 * | 6/2018 | Popescu | F01D 21/003 | |
| 10,625,881 | B2 * | 4/2020 | Teicholz | F02C 7/27 | |
| 2010/0287944 | A1 * | 11/2010 | Draper | F02C 9/00 | 60/772 |
| 2018/0347407 | A1 * | 12/2018 | Mohr | F02C 9/16 | |

* cited by examiner

*Primary Examiner* — Jesse S Bogue
(74) *Attorney, Agent, or Firm* — James Pemrick; Charlotte Wilson; Hoffman Warnick LLC

(57) ABSTRACT

A system and process for restarting a turbomachine includes a shutdown cooldown protection process implemented by a plant level control system or direct control system of the turbomachine. The system and process for restarting ensure rotating components are cooled as expected prior to a unit restart. This system and process for restarting will lockout an ability to restart if an improper cooldown of rotating components is detected. If this lockout is enabled, delaying restart for the rotating components to cool naturally is needed, or the operator could decide to force cool the components.

16 Claims, 2 Drawing Sheets

SYSTEM AND PROCESS FOR RESTARTING A TURBOMACHINE

TECHNICAL FIELD

The disclosure relates generally to a process for restarting a gas turbine of a turbomachine. More particularly, the disclosure relates generally to a process for detecting proper cooling of compressor discharge temperature to detect if a gas turbine core flow is meeting minimum flow requirements for restart of the turbomachine.

BACKGROUND

Combined cycle power plants with turbomachines and heat recovery steam generators (HRSG) are connected to electrical grids that require flexible operation to meet changing power demands. Some power grid cycles command the turbomachines to stop during low demand periods and restart soon thereafter to meet electric power demands of the grid. During operation of the turbomachine and heat recovery steam generator (HRSG), the various components expand and contract. For example, thermal expansion may occur due to the relatively elevated temperature associated with turbine operation, and mechanical expansion may occur due to centripetal forces associated with rotation of the interior components.

Turbomachine components expand and contract at different and varying rates. The varying rates result from component differences in material, geometry, location, and purpose. These differences are generally designed into turbomachine components' cooldown profiles that are factored into their restart criteria. To further accommodate for the discrepancy in expansion and contraction rates, a clearance may be designed into the turbomachine between tips of blades and corresponding casing shrouds, typically referred to as "tip clearance." Tip clearance reduces the risk of turbine damage by permitting blades to expand without contacting the shroud.

However, the tip clearance substantially reduces the efficiency of the turbine during its operation by permitting a portion of heated gas to escape past blades without performing useful work, which wastes energy that would otherwise be available. A similar clearance may be designed into the compressor between compressor blades and compressor case, which may permit air to escape past compressor blades, thereby lowering the compressor flow and efficiency.

During shutdown, ambient air infiltration can be naturally induced through the compressor and hot gas path by natural convection of hot gas contained in the turbomachine, HRSG, flue gas stacks, and pressure differences caused by wind speed and wind direction at the turbomachine inlet. This ambient air infiltration cools the turbomachine and HRSG, which can be detrimental to a quick restart due to temperature operational constraints imposed by the turbomachine and HRSG. If the HRSG and/or exhaust are not factored into a cooldown profile for restart, concerns may arise for restarting the turbomachine without undesirable rub.

Undesirable rub may occur due to expansion and an attempted restart where turbomachine components are still in an "expanded" condition, but the stator case has cooled and contracted to where the clearance is not adequate for rotation of the turbomachine. Concerns such as rubs and contraction/expansion may be the result of retrofitting an HRSG and/or exhaust to the turbomachine, where the retrofitted HRSG design and operational aspects are not factored into a cooling schema of the turbomachine.

Thus, in order to allow restart of the turbomachine as quickly as possible, without undesirable rubbing, it would be desirable for the turbomachine to include a control process that is configured to determine if minimum stack draft flow is at an acceptable level for restarting the turbomachine.

BRIEF DESCRIPTION

All aspects, examples and features mentioned below can be combined in any technically possible way.

An aspect of the disclosure provides a process for restarting a turbomachine, where the process comprises: determining whether the turbomachine has been shutdown greater than a first predetermined duration; in response to determining the turbomachine has been offline greater than the first predetermined duration, determining whether a first forward wheelspace (FFWS) temperature is greater than a predetermined FFWS temperature threshold; in response to the FFWS temperature being greater than the predetermined FFWS temperature threshold, determining whether a compressor discharge temperature (CTD) of the turbomachine is greater than a predetermined compressor temperature threshold; in response to CTD being less than the predetermined compressor temperature threshold, determining whether a restart lockout is activated; and in response to the restart lockout not being activated, allowing restart of the turbomachine.

Another aspect of the disclosure includes any of the preceding aspects, and wherein, in response to determining the turbomachine has been offline less than the first predetermined duration, allowing the restart of the turbomachine.

Another aspect of the disclosure includes any of the preceding aspects, and wherein, in response to the FFWS temperature not being greater than the predetermined FFWS temperature threshold: determining whether the turbomachine has been shutdown for greater than a third predetermined duration; in response to the turbomachine being shutdown greater than the third predetermined duration, determining that cooldown of the turbomachine is complete and allowing restart of the turbomachine; and in response to the turbomachine being shutdown less than the third predetermined duration, releasing a restart lockout signal, and allowing the restart of the turbomachine.

Another aspect of the disclosure includes any of the preceding aspects, and wherein, in response to the CTD being greater than the predetermined compressor threshold: determining whether a persistence timer is greater than a second predetermined duration; and in response to the persistence timer being greater than the second predetermined duration, activating the restart lockout.

Another aspect of the disclosure includes any of the preceding aspects, and wherein, in response to the persistence timer being less than the second predetermined duration: determining if the restart lockout is activated; and in response to the restart lockout not being activated, allowing the restart of the turbomachine.

Another aspect of the disclosure includes any of the preceding aspects, and wherein the second predetermined duration is in a range from about 1 minute to about 30 minutes.

Another aspect of the disclosure includes any of the preceding aspects, and wherein the first predetermined duration is in a range from about 180 minutes to 300 minutes.

Another aspect of the disclosure includes any of the preceding aspects, and wherein the predetermined FFWS temperature threshold is 93° C. plus (a compressor inlet temperature—minus 15° C.) of the turbomachine.

Another aspect of the disclosure provides a distributed control system comprising a non-transitory computer readable storage medium storing code for restarting a turbomachine, comprising instructions for: determining whether the turbomachine has been shutdown greater than a first predetermined duration; in response to determining the turbomachine has been offline greater than the first predetermined duration, determining whether a first forward wheelspace (FFWS) temperature is greater than a predetermined FFWS temperature threshold; in response to the FFWS temperature being greater than the predetermined FFWS temperature threshold, determining whether a compressor discharge temperature (CTD) of the turbomachine is greater than a predetermined compressor temperature threshold; in response to CTD being less than the predetermined compressor temperature threshold, determining whether a restart lockout is activated; and in response to the restart lockout not being activated, allowing restart of the turbomachine.

Another aspect of the disclosure includes any of the preceding aspects, and wherein, in response to determining the turbomachine has been offline less than the first predetermined duration, allowing the restart of the turbomachine.

Another aspect of the disclosure includes any of the preceding aspects, and wherein, in response to the FFWS temperature not being greater than the predetermined FFWS temperature threshold: determining whether the turbomachine has been shutdown for greater than a third predetermined duration; in response to the turbomachine being shutdown greater than the third predetermined duration, determining that cooldown of the turbomachine is complete and allowing restart of the turbomachine; and in response to the turbomachine being shutdown less than the third predetermined duration, releasing a restart lockout signal, and allowing the restart of the turbomachine.

Another aspect of the disclosure includes any of the preceding aspects, and wherein, in response to the CTD being greater than the predetermined compressor threshold: determining whether a persistence timer is greater than a second predetermined duration; and in response to the persistence timer being greater than the second predetermined duration, activating the restart lockout.

Another aspect of the disclosure includes any of the preceding aspects, and wherein, in response to the persistence timer being less than the second predetermined duration: determining if the restart lockout is activated; and in response to the restart lockout not being activated, allowing the restart of the turbomachine.

Another aspect of the disclosure includes any of the preceding aspects, and wherein the second predetermined duration is in a range from about 1 minute to about 30 minutes.

Another aspect of the disclosure includes any of the preceding aspects, and wherein the first predetermined duration is in a range from about 180 minutes to 300 minutes.

Another aspect of the disclosure includes any of the preceding aspects, and wherein the predetermined FFWS temperature threshold is 93° C. plus (a compressor inlet temperature—minus 15° C.) of the turbomachine.

Two or more aspects described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

BRIEF DESCRIPTION OF THE DRAWINGS

These and other features of this disclosure will be more readily understood from the following detailed description of the various aspects of the disclosure taken in conjunction with the accompanying drawings that depict various embodiments of the disclosure, in which.

Figure 1:
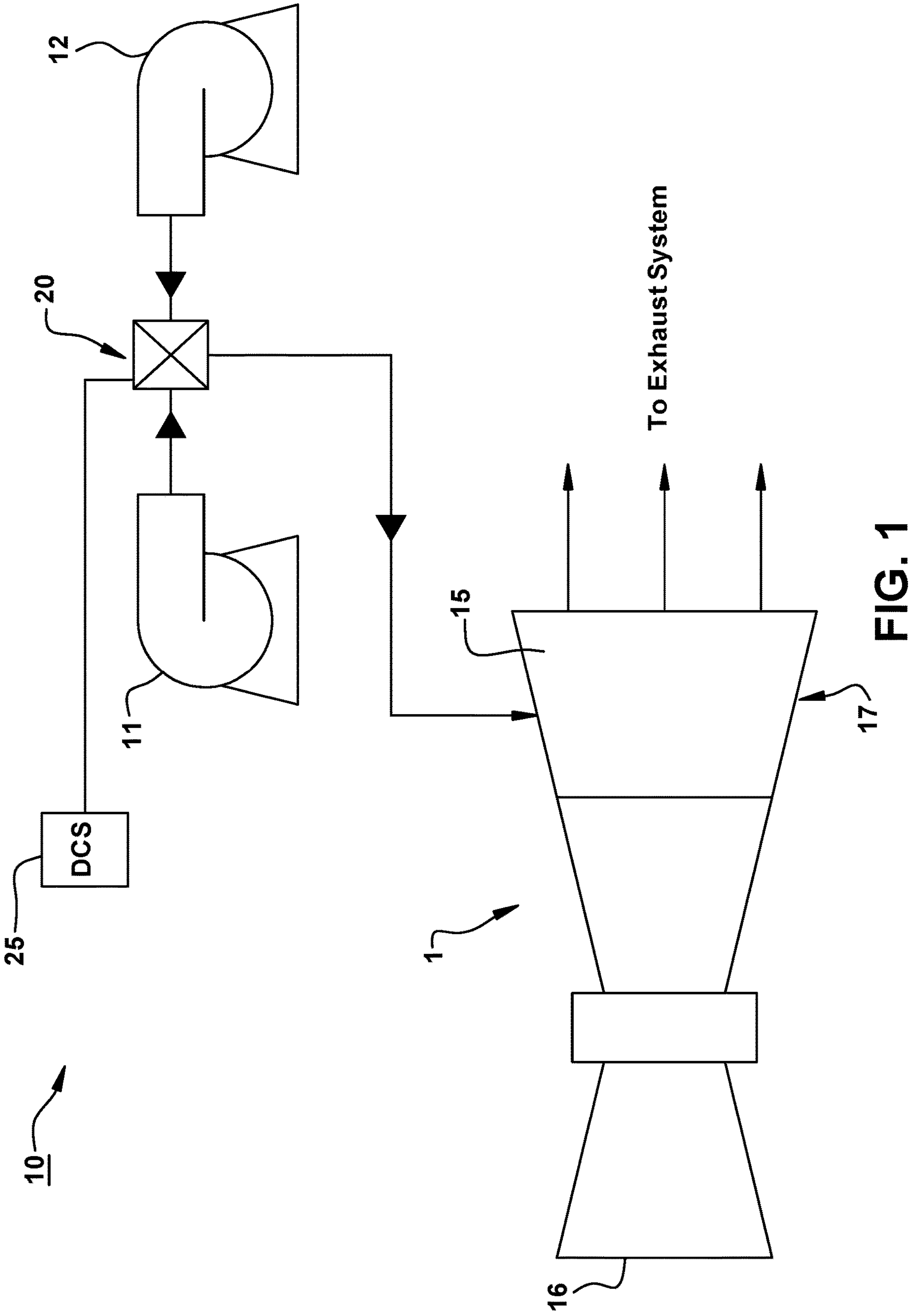
FIG. 1 illustrates a schematic view of exhaust fan/exhaust stack and turbomachine configuration, according to embodiments of the disclosure.

It is noted that the drawings of the disclosure are not necessarily to scale. The drawings are intended to depict only typical aspects of the disclosure and therefore should not be considered as limiting the scope of the disclosure. In the drawings, like numbering represents like elements between the drawings.

DETAILED DESCRIPTION

As an initial matter, in order to clearly describe the current subject matter, it will become necessary to select certain terminology when referring to and describing relevant machine components within the illustrative application of a turbomachine. When doing this, if possible, common industry terminology will be used and employed in a manner consistent with its accepted meaning. Unless otherwise stated, such terminology should be given a broad interpretation consistent with the context of the present application and the scope of the appended claims. Those of ordinary skill in the art will appreciate that often a particular component may be referred to using several different or overlapping terms. What may be described herein as being a single part may include and be referenced in another context as consisting of multiple components. Alternatively, what may be described herein as including multiple components may be referred to elsewhere as a single part.

In addition, several descriptive terms may be used regularly herein, and it should prove helpful to define these terms at the onset of this section. These terms and their definitions, unless stated otherwise, are as follows. As used herein, "downstream" and "upstream" are terms that indicate a direction relative to the flow of a fluid, such as the working fluid through the turbomachine or, for example, the flow of air through the combustor or coolant through one of the turbomachine's component systems. The term "downstream" corresponds to the direction of flow of the fluid, and the term "upstream" refers to the direction opposite to the flow. The terms "forward" and "aft," without any further specificity, refer to directions, with "forward" referring to the front or compressor end of the turbomachine, and "aft" referring to the rearward or turbine end of the turbomachine. As used herein, the terms "turbomachine" and "gas turbine" are used interchangeably to refer to a gas turbine engine (e.g., as used for electrical power generation), which includes a compressor section, a combustion section, and an expansion turbine section.

It is often required to describe parts that are at different radial positions with regard to a center axis. The term "axial" refers to movement or position parallel to an axis, e.g., an axis of a turbomachine. The term "radial" refers to movement or position perpendicular to an axis, e.g., an axis of a turbomachine. In cases such as this, if a first component resides closer to the axis than a second component, it will be stated herein that the first component is "radially inward" or "inboard" of the second component. If, on the other hand, the first component resides further from the axis than the second component, it may be stated herein that the first component is "radially outward" or "outboard" of the second component. Finally, the term "circumferential" refers to movement or position around an axis, e.g., a circumferential interior surface of a casing extending about an axis of a turbomachine. As indicated above, it will be appreciated that such terms may be applied in relation to the axis of the turbomachine.

In addition, several descriptive terms may be used regularly herein, as described below. The terms "first," "second," and "third," may be used interchangeably to distinguish one component from another and are not intended to signify location or importance of the individual components.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. "Optional" or "optionally" means that the subsequently described event may or may not occur or that the subsequently described feature may or may not be present and that the description includes instances where the event occurs, or the feature is present and instances where the event does not occur, or the feature is not present.

Where an element or layer is referred to as being "on," "engaged to," "connected to," "coupled to," or "mounted to" another element or layer, it may be directly on, engaged, connected, coupled, or mounted to the other element or layer, or intervening elements or layers may be present. In contrast, when an element is referred to as being "directly on," "directly engaged to," "directly connected to," or "directly coupled to" another element or layer, there are no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The verb forms of "couple" and "mount" may be used interchangeably herein.

As embodied by the disclosure, to allow restarting of a turbomachine and HRSG as quickly as possible, induced draft through the turbomachine and HRSG can be actively controlled. Traditionally, in order to counteract the draft, variable inlet guide vanes of the turbomachine compressor (i.e., vanes provided at the inlet of the compressor to control the air flow through turbomachine) are closed, and/or intake dampers and louvers (provided, e.g., in the inlet section upstream of the compressor), and/or stack dampers (provided, e.g., at the stack) are closed. This traditional approach may reduce natural draft through the turbomachine and possibly the HRSG. However, leakages within the turbomachine, as described herein, can still result in a substantial amount of induced natural draft.

FIG. 1 illustrates a schematic view of a turbomachine system 10, such as a gas turbine. In FIG. 1, a portion of cooling flow generated by exhaust frame blowers 11, 12 can be injected into the gas turbine exhaust frame 15. This portion of cooling flow is expected to exit through exhaust system 17 and not backflow through gas turbine inlet 16. For some turbomachines 10, exhaust frame blowers may be designed to stay on for a predetermined time, such as about 4 hours after a unit (e.g., a combustor of gas turbine 1) flames out.

A second flow (not shown) may be required after gas turbine 1 flameout to maintain a minimum gas turbine core flow, which enters from gas turbine inlet 16 and exits through gas turbine exhaust system 17.

As embodied by the disclosure, clearance gaps are modeled with an expected cooldown profile following a fired shutdown. If a proper amount of gas turbine core flow is not maintained, rotating components may cool down slower than expected, which has the potential to lead to tighter clearances and/or component rubs on a subsequent restart. Additionally, maintaining proper and reliable core flow is advantageous to reduce stratification inside the gas turbine flow path that can lead to distortions that may also have negative rotor-stator clearance consequences during turning gear operation or turbomachine restart. Minimum gas turbine core flow may need to be maintained for prolonged periods of time (e.g., ~24 hrs.) after flameout to ensure the rotating components are properly cooled, leading to significant downtime for the gas turbine 1.

The design of the exhaust system downstream of the gas turbine needs to consider these two shutdown flow requirements. One type of exhaust system that is designed to meet these shutdown requirements may utilize a counter-balanced damper door 20 connected to the exhaust stack, which opens when a pressure gradient is observed. When a turbomachine connected to this exhaust system type is shutdown, hot air from gas turbine exhaust system 17 will generate an amount of buoyancy-driven draft flow. This stack draft flow may also generate a negative pressure source in exhaust system 17 and open the counter-balanced damper door 20 (FIG. 1). Once the exhaust cools down, buoyancy-driven draft flow will decrease, and the counter-balanced damper door 20 will naturally close.

A shutdown cooldown protection process, implementable by a plant-level control system (DCS) 25 (FIG. 1) that is connected to counter-balanced damper door 20, is provided. The process, which is implemented by the DCS 25, ensures the stack draft flow to rotating components for cooling prior to a unit restart is sufficient to avoid undesirable rubs. The shutdown cooldown protection process, as embodied by the disclosure, is applied to the turbomachine's software for plant configurations that include a damper door 20 in the exhaust flow path downstream of the gas turbine 1. This shutdown cooldown protection process, in certain aspects of the embodiments, will lockout an ability to restart the turbomachine if improper cooldown of rotating components is detected. If this lockout is enabled, the restart of the turbomachine is delayed to allow the rotating components to cool naturally, or the turbomachine operator could force cool the turbomachine components by selecting crank cooling of the turbomachine.

As embodied by the disclosure, a stack draft required signal is independent of the turbomachine restart capability. This stack draft required signal, along with multiple other signals, are integrated into the plant-level distributed control system (DCS) 25 to determine how to control any stack dampers, stack temperature targets, or other exhaust systems. This stack draft required signal is intended to notify DCS 25 (FIG. 1) of conditions in which the stopped turbomachine (gas turbine 1) requires and/or would benefit from a negative pressure source in its exhaust system 17 to allow for proper cooldown.

Figure 2:
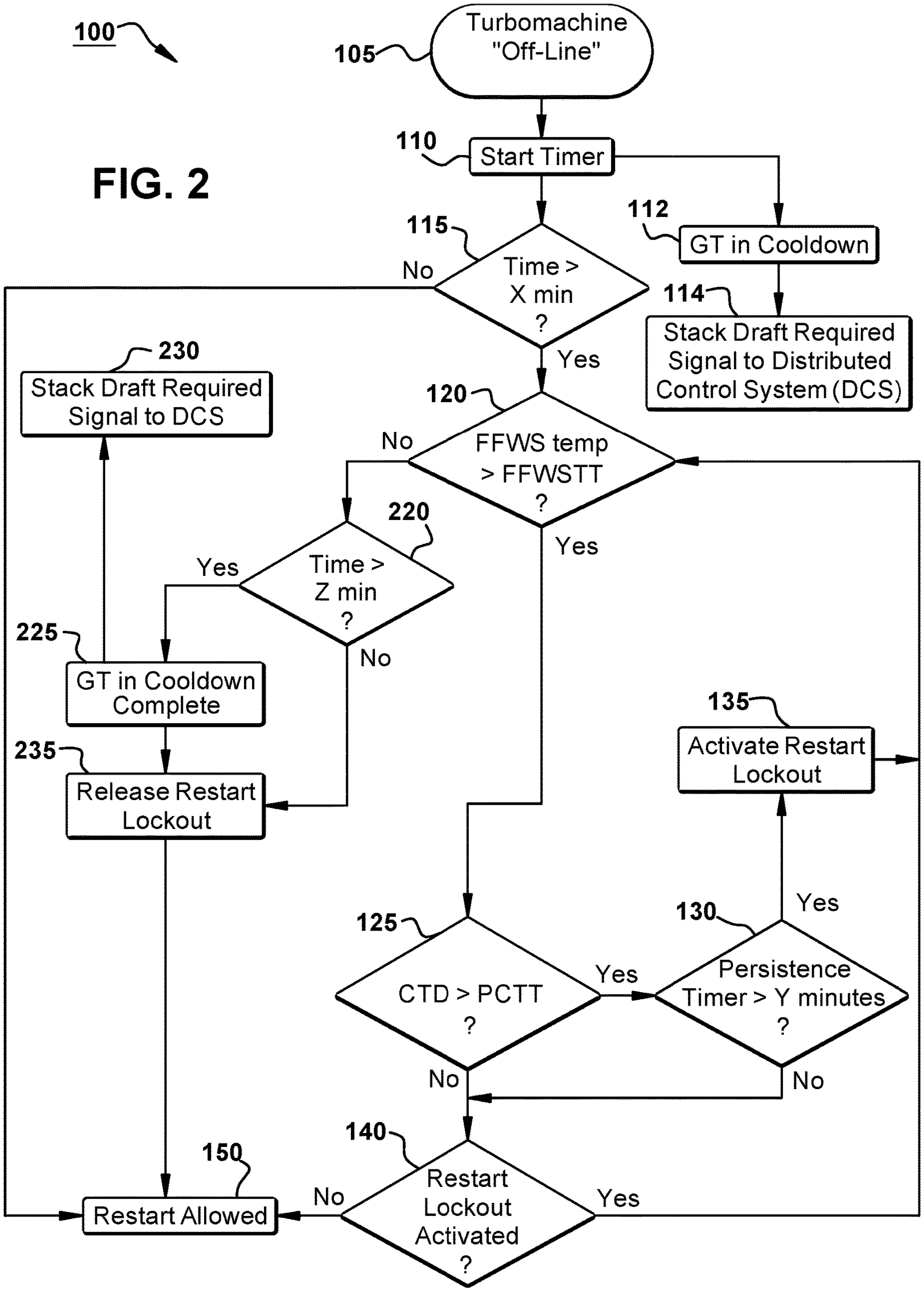
FIG. 2 is a flowchart of a process for determining if turbomachine can be restarted, according to embodiments of the disclosure.

FIG. 2 is a flow chart of the shutdown cooldown protection process 100, as embodied by the disclosure, for determining if conditions for restarting a turbomachine are acceptable. In FIG. 2, "No" is a no (negative) determination at a decision block, and "Yes" is a yes (positive) determination at a decision block.

The shutdown cooldown protection process 100 begins at step 105 with a flameout or other stoppage of turbomachine, so the turbomachine is "off-line." A (persistent) timer is started at step 110 to measure the length of turbomachine stoppage. Together with timer start up, the turbomachine is designated as in cooldown at step 112, and, subsequently, a stack draft required signal is generated in step 114. Referring to the timer being started at step 110 to measure the length of turbomachine stoppage, at step 115, DCS 25 determines whether the turbomachine has been shut down greater than a first predetermined duration "X", e.g., a determination of the time being greater than X minutes is analyzed at step 115. First predetermined duration X minutes (hereafter "first duration X") is generally set by the design characteristics of the turbomachine and, in particular, the exhaust frame blower specifications. An exhaust frame blower "on" requirement provides cooling airflow just after shutdown of the turbomachine. The length of the first duration X may vary. As embodied by the disclosure, the first predetermined duration X can be in a range from about 180 minutes to 300 minutes. As embodied by the disclosure, the first predetermined duration X can be in a range from about 210 minutes to 270 minutes. An exemplary and non-limiting value of first duration X includes 240 minutes.

At step 150, in response to determining the turbomachine has been off-line less than first duration X ("No" at step 115), DCS 25 allows restart of the turbomachine. That is, if the time the turbomachine has been shut down is less than first duration X, DCS 25 allows restart at step 150.

However, in response to determining the turbomachine has been off-line greater than the first duration X ("Yes" at step 115), DCS 25 determines at step 120 whether a first forward wheelspace (FFWS) temperature is greater than a predetermined FFWS temperature threshold (FFWSTT). That is, if the time that the turbomachine is shut down is greater than first duration X, DCS 25 moves to step 120 where a determination of whether a first forward wheelspace (FFWS) temperature is greater than a predetermined FFWS temperature threshold occurs. In certain non-limiting examples, at step 120, the predetermined first forward wheel space (FFWS) temperature threshold, which is used for comparison, is defined as the sum of 93° C. (or 200° F.) plus (compressor inlet temperature (CTIM) minus 15° C. (or 59° F.)). Here, as embodied by the disclosure, 15° C. is a normalization temperature. The design point is typically about 15° C., and shutdown cooldown protection process 100 normalizes the determination in step 120 to a design point.

In response to determining a first forward wheelspace (FFWS) temperature is greater than a predetermined FFWS temperature threshold (for example, FFWS is greater than 93° C. (or 200° F.) plus (compressor inlet temperature (CTIM) minus 15° C.) (or 59° F.)) ("Yes" at step 120), DCS 25 determines at step 125 if a compressor discharge temperature (CTD) of the turbomachine is greater than a predetermined compressor temperature threshold (PCTT). In certain embodiments, the PCTT is equal to an allowable CTD (as determined by the turbomachine design) plus an ambient temperature at the inlet duct (ATID).

If CTD is greater than PCTT (as determined by the turbomachine design) ("Yes" at step 125), at step 130, DCS 25 checks the timer and determines if the expended time is greater than a second predetermined duration Y (hereafter "second duration Y"). In response to the persistence timer being greater than second duration Y ("Yes" at step 130), DCS 25 at step 135 activates the restart lockout protocol and returns processing to step 120. Hence, step 130 determines if the lapsed time duration since the turbomachine went off-line exceeds a limit to declare a unit restart lockout, where lockout prevents restart at step 135. The persistence timer, as embodied by the disclosure, can reduce any false positive events due to sensor noise. Also, the persistence timer, as embodied by the disclosure, can provide a plant operator with some time, if needed or required, to adjust exhaust conditions such that an expected cooldown profile can be restored.

Second duration Y can be designated by properties of the turbomachine and its components. In certain aspects of the embodiment, the second duration Y can be in a range from about 1 minute to about 30 minutes, can be in a range from about 5 minutes to about 20 minutes, and can be about 10 minutes.

As noted, from step 135, DCS 25 returns processing to step 120. Shutdown cooldown protection process 100 proceeds from step 120 as described herein.

In response to the persistence timer being less than second duration Y ("No" at step 130), at step 140, DCS 25 determines if the restart lockout protocol is activated. Similarly, in response to CTD being less than the PCTT ("No" at step 125), at step 140, DCS 25 determines whether the restart lockout protocol is activated. That is, if DCS 25, as embodied by the disclosure, determines a "No" at either step 125 or step 130, at step 140, the DCS 25 determines if the restart lockout protocol is activated. The term "restart lockout" (or "restart lockout protocol") means that restarting the turbomachine is not permitted without operator authorization. If the restart lockout is not activated, at step 150, DCS 25 allows restart of the turbomachine.

However, if at step 140, DCS 25 determines that restart lockout is activated ("Yes" at step 140), DCS 25 proceeds back to step 120.

With respect to step 120, if the determination in step 120 indicates that first forward wheelspace (FFWS) temperature is less than a predetermined FFWS temperature threshold ("No" at step 120), DCS 25 proceeds to step 220. At step 220, DCS 25 makes a determination of whether the elapsed time since shutdown is greater than a third duration Z. The third duration Z is generally set by the design characteristics of the turbine and indicates a time duration after which the turbomachine can be considered to have completed cooldown (e.g., third duration Z may be about 240 minutes). If the third duration is greater than Z minutes, the process flow then passes to step 225 (cooldown complete). From step 225, the process proceeds to steps 230 and 235. At step 230, the DCS 25 generates a stack draft required signal. At step 235, the DCS 25 generates a release of a restart lockout protocol and subsequentially allows restart of the turbomachine at step 150. If the elapsed third duration is less that the third duration Z ("No" at step 220), the process moves to step 235, and a release of a restart lockout is generated by the DCS 25, and a restart of the turbomachine is allowed at step 150.

The stack draft required signal at step 230 is independent of the turbomachine restart capability. This stack draft required signal, along with multiple other signals, are integrated into DCS 25 to determine how to control any stack dampers, stack temperature targets, or other exhaust systems. The stack draft required signal at step 230 indicates that the turbomachine is requesting a negative pressure source in its exhaust system to allow for proper cooldown.

As will be appreciated by one skilled in the art, the present disclosure may be embodied as a system, method, or controls that may utilize a computer program product. Accordingly, the present disclosure may include hardware embodiments, software embodiment (including firmware, resident software, micro-code, etc.) or an embodiment combining software and hardware aspects that may all generally be referred to herein as a "circuit," "module" or "system." Furthermore, the present disclosure may take the form of a computer program-enabled control embodied in any tangible medium of expression having computer-usable program code embodied in the medium.

In the context of this document, a computer-usable or computer-readable medium may be any medium that can contain, store, communicate, propagate, or transport the program for use by or in connection with the instruction execution system, apparatus, or device. Any combination of one or more computer-usable or computer-readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium includes the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. The computer-usable medium may include a propagated data signal with the computer-usable program code embodied therewith, either in baseband or as part of a carrier wave. The computer-usable program code may be transmitted using any appropriate medium, including but not limited to wireless, wireline, optical fiber cable, RF, etc.

Computer program code for carrying out operations of the present disclosure may be written in any combination of one or more programming languages, including an object-oriented programming language such as Java, Smalltalk, C++, or the like and conventional procedural programming languages, such as the "C" programming language or similar programming languages. The program code may execute entirely on the user's computer, partly on the user's computer, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the blocks of the flowchart and/or block diagram.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the blocks of the flowchart and/or block diagram.

The flowchart and block diagrams in the Figures illustrate the architecture, functionality, and operation of possible implementations of systems, methods, and computer program products, according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart, and combinations of blocks in the block diagrams and/or flowchart, can be implemented by special purpose hardware-based systems that perform the specified functions or acts, or combinations of special purpose hardware and computer instructions.

As discussed herein, various systems and components are described as "determining" or "obtaining" data. It is understood that the corresponding data can be obtained using any solution. For example, the corresponding system/component can generate and/or be used to generate the data, retrieve the data from one or more data stores (e.g., a database), receive the data from another system/component, and/or the like. When the data is not generated by the particular system/component, it is understood that another system/component can be implemented apart from the system/component shown, which generates the data and provides it to the system/component and/or stores the data for access by the system/component.

The foregoing drawings show some of the processing associated according to several embodiments of this disclosure. In this regard, each drawing or block within a flow diagram of the drawings represents a process associated with embodiments of the method described. It should also be noted that in some alternative implementations, the acts noted in the drawings or blocks may occur out of the order noted in the figure or, for example, may in fact be executed substantially concurrently or in the reverse order, depending upon the act involved. Also, one of ordinary skill in the art will recognize that additional blocks that describe the processing may be added.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise. "Approximately," as applied to a particular value of a range, applies to both end values and, unless otherwise dependent on the precision of the instrument measuring the value, may indicate +/−10% of the stated value(s).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and explanation but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and its practical application and to enable others of ordinary skill in the art to understand the disclosure such that various modifications as are suited to a particular use may be contemplated.

What is claimed is:

1. A process for restarting a turbomachine, the process comprising:

determining whether the turbomachine has been shutdown greater than a first predetermined duration;

in response to determining the turbomachine has been offline greater than the first predetermined duration, determining whether a first forward wheelspace (FFWS) temperature is greater than a predetermined FFWS temperature threshold;

in response to the FFWS temperature being greater than the predetermined FFWS temperature threshold, determining whether a compressor discharge temperature (CTD) of the turbomachine is greater than a predetermined compressor temperature threshold;

in response to CTD being less than the predetermined compressor temperature threshold, determining whether a restart lockout is activated; and in response to the restart lockout not being activated, allowing restart of the turbomachine.

2. The process according to claim 1, wherein, in response to determining the turbomachine has been offline less than the first predetermined duration, allowing the restart of the turbomachine.

3. The process according to claim 1, wherein, in response to the FFWS temperature not being greater than the predetermined FFWS temperature threshold:

determining whether the turbomachine has been shutdown for greater than a third predetermined duration;

in response to the turbomachine being shutdown greater than the third predetermined duration, determining that cooldown of the turbomachine is complete and allowing restart of the turbomachine; and in response to the turbomachine being shutdown less than the third predetermined duration, releasing a restart lockout signal, and allowing the restart of the turbomachine.

4. The process according to claim 1, wherein, in response to the CTD being greater than the predetermined compressor threshold:

determining whether a persistence timer is greater than a second predetermined duration; and in response to the persistence timer being greater than the second predetermined duration, activating the restart lockout.

5. The process according to claim 4, in response to the persistence timer being less than the second predetermined duration:

determining if the restart lockout is activated; and in response to the restart lockout not being activated, allowing the restart of the turbomachine.

6. The process according to claim 4, wherein the second predetermined duration is in a range from about 1 minute to about 30 minutes.

7. The process according to claim 1, wherein the first predetermined duration is in a range from about 180 minutes to 300 minutes.

8. The process according to claim 1, wherein the predetermined FFWS temperature threshold is 93° C. plus (a compressor inlet temperature—minus 15° C.) of the turbomachine.

9. A distributed control system comprising a non-transitory computer readable storage medium storing code for restarting a turbomachine, comprising instructions for:

determining whether the turbomachine has been shutdown greater than a first predetermined duration;

in response to determining the turbomachine has been offline greater than the first predetermined duration, determining whether a first forward wheelspace (FFWS) temperature is greater than a predetermined FFWS temperature threshold;

in response to the FFWS temperature being greater than the predetermined FFWS temperature threshold, determining whether a compressor discharge temperature (CTD) of the turbomachine is greater than a predetermined compressor temperature threshold;

in response to CTD being less than the predetermined compressor temperature threshold, determining whether a restart lockout is activated; and in response to the restart lockout not being activated, allowing restart of the turbomachine.

10. The distributed control system according to claim 9, wherein, in response to determining the turbomachine has been offline less than the first predetermined duration, allowing the restart of the turbomachine.

11. The distributed control system according to claim 9, wherein, in response to the FFWS temperature not being greater than the predetermined FFWS temperature threshold:

determining whether the turbomachine has been shutdown for greater than a third first predetermined duration;

in response to the turbomachine being shutdown greater than the third predetermined duration, determining that cooldown of the turbomachine cooldown is complete and allowing the restart of the turbomachine; and in response to the turbomachine being shutdown less than the third predetermined duration, releasing a restart lockout signal, and allowing the restart of the turbomachine.

12. The distributed control system according to claim 9, wherein, in response to the CTD being greater than the predetermined compressor threshold:

determining whether a persistence timer is greater than a second predetermined duration; and in response to the persistence timer being greater than the second predetermined duration, activating the restart lockout.

13. The distributed control system according to claim 12, in response to the persistence timer being less than the second predetermined duration:

determining if the restart lockout is activated; and in response to the restart lockout not being activated, allowing the restart of the turbomachine.

14. The distributed control system according to claim 12, wherein the second predetermined duration is in a range from about 1 minute to about 30 minutes.

15. The distributed control system according to claim 9, wherein the first predetermined duration is in a range from about 180 minutes to 300 minutes.

16. The distributed control system according to claim 9, wherein the predetermined FFWS temperature threshold is 93° C. plus (a compressor inlet temperature minus 15° C.) of the turbomachine.

* * * * *